United States Patent
Mishra et al.

(10) Patent No.: US 12,452,767 B2
(45) Date of Patent: Oct. 21, 2025

(54) METHOD AND APPARATUS FOR ROUTE AGGREGATION HANDLING FOR CONTROL AND USER PLANE SEPARATION

(71) Applicant: MAVENIR SYSTEMS, INC., Richardson, TX (US)

(72) Inventors: Abhishek Mishra, Karnataka (IN); Vipin Padlikar, Karnataka (IN); Rohit Gupta, Karnataka (IN); Tamanna Jindal, McKinney, TX (US)

(73) Assignee: Mavenir Systems, Inc., Richardson, TX (US)

( * ) Notice: Subject to any disclaimer, the term of this patent is extended or adjusted under 35 U.S.C. 154(b) by 594 days.

(21) Appl. No.: 17/886,582

(22) Filed: Aug. 12, 2022

(65) Prior Publication Data

US 2023/0055358 A1 Feb. 23, 2023

(30) Foreign Application Priority Data

Aug. 20, 2021 (IN) .............................. 202121037889

(51) Int. Cl.
*H04W 40/30* (2009.01)
*H04W 40/06* (2009.01)
*H04W 40/24* (2009.01)

(52) U.S. Cl.
CPC ........... *H04W 40/30* (2013.01); *H04W 40/06* (2013.01); *H04W 40/248* (2013.01)

(58) Field of Classification Search
CPC .... H04W 40/30; H04W 40/06; H04W 40/248
See application file for complete search history.

(56) References Cited

U.S. PATENT DOCUMENTS

| | | | |
|---|---|---|---|
| 2015/0110095 A1* | 4/2015 | Tan | H04L 63/20 370/338 |
| 2017/0118275 A1 | 4/2017 | Singh et al. | |

(Continued)

OTHER PUBLICATIONS

3GPP TS 23.501 v. 16.2.0 3rd Generation Partnership Project; Technical Specification Group Services and System Aspects; System Architecture for the 5G System (5GS); Stage 2 (Release 16); 3rd Generation Partnership Project; Sep. 2019.

(Continued)

*Primary Examiner* — Gary Mui
*Assistant Examiner* — Yewon Kim
(74) *Attorney, Agent, or Firm* — Ruggiero McAllister & McMahon LLC

(57) ABSTRACT

A Shared Cell (SC) Controller uses deployment information, radio resource utilization measurements, cell load measurements, signal quality measurement, operator's policies and radio capabilities to make decisions on system configuration, re-configuration, and channel allocation related to the Shared Cell groups. The SC Controller may also use artificial intelligence/machine learning to predict future system state when making decisions on system configuration and channel allocation. The SC Controller can be implemented in the context of using a CBRS system, the ORAN architecture, and the Shared Cell group of Radio Units (RUs). SC Controller can be implemented as part of the Non-Real Time Radio Intelligent Controller (Non-RT RIC). The SC Controller interfaces with the Citizens Broadband Radio Service Device (CBSD) Controller, and the SC Controller sends the Shared Cell group information to the O-RU Controller so that the O-RU Controller can configure the radio components.

18 Claims, 5 Drawing Sheets

(56) References Cited

U.S. PATENT DOCUMENTS

2018/0295659 A1* 10/2018 Shan ................. H04W 4/24
2022/0116305 A1* 4/2022 Niu .................. H04L 45/02

OTHER PUBLICATIONS

3GPP TS 23.502 v. 16.2.0 3rd Generation Partnership Project; Technical Specification Group Services and System Aspects; Procedures for the 5G System (5GS); Stage 2 (Release 16); 3rd Generation Partnership Project; Sep. 2019.
Rekhter et al. "A Border Gateway Protocol 4 (BGP-4)" The Internet Society, Jan. 2006.
3GPP TS 29.244 v. 16.3.1 3rd Generation Partnership Project; Technical Specification Group Core Network and Terminals; Interface Between the Control Plane and User Plane Nodes; Stage 3 (Release 16); 3rd Generation Partnership Project; Apr. 2020.
3GPP TS 29.571 v. 16.3.0 3rd Generation Partnership Project; Technical Specification Group Core Network and Terminals; 5G System; Common Data Types for Service Based Interfaces; Stage 3 (Release 16); 3rd Generation Partnership Project; Mar. 2020.
Cisco Systems et al: "Considerations and solution for UE IP address management", 3GPP Draft; S2-160082_PCR_CUPS_UE IP ADDRESS_R4, 3rd Generation Partnership Project (3GPP), Mobile Competence Centre; 650, Route Des Lucioles; F-06921 Sophia-Antipolis Cedex; France; vol. SA WG2, no. Saint Kitts, KN; Jan. 25, 2016-Jan. 29, 2016; Jan. 19, 2016 (Jan. 19, 2016), XP051072003, Retrieved from the Internet: URL:http://www.3gpp.org/ftp/tsg_sa/WG2_Arch/TSGS2_113_St_Kitts/Docs/ [retrieved on Jan. 19, 2016].
Cisco Systems et al: "Considerations and solution for UE IP address management", 3GPP DRAFT;S2-160082_PCR_CUPS_UE IP ADDRESS_R4, 3rd Generation Partnership Project (3GPP), Mobile Competence Centre; 650, Route Des Lucioles; F-06921 Sophia-Antipolis Cedex; France; vol. SA WG2, no. Saint Kitts, KN; Jan. 25, 2016-Jan. 29, 2016; Jan. 17, 2016 (Jan. 17, 2016), XP051059740, Retrieved from the Internet: URL:http://www.3gpp.org/ftp/Meetings_3GPP_SYNC/SA2/Docs/ [retrieved on Jan. 17, 2016].
Huawei: "Pseudo-CR on PGW-C and PGW-U restoration", 3GPP Draft; C4-172267_REV_C4-172228_REV_C4-172183_CUPS_PGW_RESTORATION REV2, 3rd Generation Partnership Project (3GPP), Mobile Competence Centre; 650, Route Des Lucioles; F-06921 Sophia-Antipolis CE, vol. CT WG4, no. Spokane, US; Apr. 3, 2017-Apr. 7, 2017; Apr. 7, 2017 (Apr. 7, 2017), XP051250410, Retrieved from the Internet: URL:http://www.3gpp.org/ftp/tsg_ct/WG4_protocollars_ex-CN4/TSGCT4_77_Spokane/Docs/ [retrieved on Apr. 7, 2017].
Cisco Systems Inc: "Pseudo-CR on Solution for PGW-U Failure without Restart—Solution#1", 3GPP Draft; C4-164274_PCR_PGW-U-FAILURE-WITHOUT-RESTART-SOL#1, 3rd Generation Partnership Project (3GPP), Mobile Competence Centre; 650, Route Des Lucioles; F-06921 Sophia-Antipolis Cedex; France, vol. CT WG4, no. Tenerife, Spain; Jul. 25, 2016-Jul. 29, 2016; Jul. 29, 2016 (Jul. 29, 2016), XP051141827, Retrieved from the Internet: URL:http://www.3gpp.org/ftp/tsg_ct/WG4_protocollars_ex-CN4/TSGCT4_74_Tenerife/Docs/ [retrieved on Jul. 29, 2016].
Extended European Search Report for corresponding European application EP22190823.9, 9 pages, dated Oct. 27, 2022.

* cited by examiner

METHOD AND APPARATUS FOR ROUTE AGGREGATION HANDLING FOR CONTROL AND USER PLANE SEPARATION

BACKGROUND OF THE DISCLOSURE

1. Field of the Disclosure

The present disclosure relates to systems and methods for 3rd Generation Partnership Project (3GPP) Control Plane and User Plane Separation (CUPS) architecture, and relates more particularly to route aggregation handling for CUPS.

2. Description of the Related Art

The 3GPP has defined the Control Plane and User Plane Separation (CUPS) architecture, where Control Plane (CP) (e.g., PGW-C or SMF) can allocate the IP Address to the User Equipment (UE) Packet Data Unit (PDU) Session. When CP allocates an Internet Protocol (IP) Address to a UE PDU Session, it sends the same to the UPF in the Packet Forwarding Control Protocol (PFCP) Message. In such a case, the CP can have a local IP Pool from which it can allocate the IP Address or use Dynamic Host Configuration Protocol (DHCP) procedure to get the IP Address from external IP Pool (sequential range of IP addresses). The IP Pool are configured with IP Addresses in block of routes. For example, in IPv4 IP Address scheme, the blocks can be of varying size via routing protocol such as iBGP, eBGP towards the upstream router. Advertisement of /32 routes leads to bloating of the Routing information based on the routers implementing the lookup and subsequent routing of Downlink (DL) packets time consuming.

The User Plane (UP), e.g., Packet Gate Way-User (PGW-U) or User Plane Function (UPF), has to inform the next hop router about the routes to be used, e.g., Internal Border Gateway Protocol (iBGP) or External Border Gateway Protocol (eBGP) or some other protocol, so that the downlink packets can be sent to the correct UPF by the next hop router. In the present disclosure, the terms UP, UPF and UP node will be used interchangeably.

FIG. 1 shows the CP and UP interworking with a router as the next hop. The CP 1001 (which can encompass, e.g., PGW-C or Session Management Function (SMF)) is connected with two user plane nodes (UP1 1002 and UP2 1003), and two UEs are connected with the user plane nodes, i.e., UE1 1004 is connected with UP1 1002, and UE2 1005 is connected with UP2 1003. The user plane traffic of both UE1 1004 and UE2 1005 goes through a router 1006 to the internet service 1007.

When UE IP Address is allocated by the CP, the downlink traffic (i.e., the traffic coming from the internet service 1007 towards a selected UE) routing creates a challenge, as the router 1006 does not know whether it has to route to UP1 or UP2, in the absence of such information provided to the router. More specifically, the router 1006 cannot route the downlink traffic to the correct UP, unless the router 1006 is aware of the UE address or IP Pool details to which the UE address belongs.

In addition, during the process of UP path failure and recovery of the UP, the IP Pool allocated by the CP is to be retrieved again by the standby UP node and propagated to the next hop router, so that the downlink packets can be routed to the correct UP. The IP pools allocated by the CP are not stored at the UP node in persistent memory, because in the course of the UP path failure and recovery of the UP, the IP pools may be reallocated to some other UP.

Furthermore, during the TCP connection reset handling between the UP and the router, the IP pools are to be retrieved again from the CP and propagated to the next hop router, so that the downlink packets can be routed to the correct UP.

In the scenario in which the CP allocates the IP Pools and traffic routing is done at the UP, the downlink traffic routing poses a challenge. In addition, in the scenario involving the UP path failure and recovery of the UP, where the routes are not in the persistent storage at the UP, fetching and providing the route to the next hop router for correct downlink packet routing to the updated UP poses a challenge. Therefore, there is a need to provide solutions to these issues.

SUMMARY OF THE DISCLOSURE

In accordance with an example embodiment of the present disclosure, in the case when the CP is allocating the IP pools and data traffic routing is done at the UP, a method is provided for obtaining the IP pool blocks and providing them to the next hop router for the correct packet routing. During the start or update of the CP-UP association, the CP sends the routes to be used to the UP in an information element (IE), e.g., a vendor-specific IE.

In accordance with an example embodiment of the present disclosure, during the update of the CP-UP association, the CP can decide to remove certain routes to be used by the UP (e.g., in a vendor-specific IE). An Association Update Request is sent by the CP to the UP, which Association Update Request includes, e.g., Route Aggregation IE, which in turn contains an Action IE (in this example, DELETE) and APN/DNN Route Aggregation IE. The APN/DNN Route Aggregation IE contains the field "IP Pool Route Aggregation" (the routes to be deleted by the UP).

According to an example embodiment of the present disclosure, during the UP path failure and recovery, when the standby UP takes over after the UP path failure and recovery, the standby UP shall send an Association Update Request to obtain the route(s). An Association Update Request is sent by the UP to the CP, which Association Update Request includes, e.g., Route Aggregation IE. In response, the CP sends the Association Update Response with Route Aggregation IE containing the Action IE (ADD) and APN/DNN Route Aggregation IE containing the field "IP Pool Route Aggregation" (the routes to be used by the UP.

According to an example embodiment of the present disclosure, in a scenario involving a reset of the Transmission Control Protocol (TCP) connection between a router and the UP, in order to handle this reset, the UP shall fetch the routes from the respective CP and install the routes to the next hop router.

DETAILED DESCRIPTION

Figure 1:
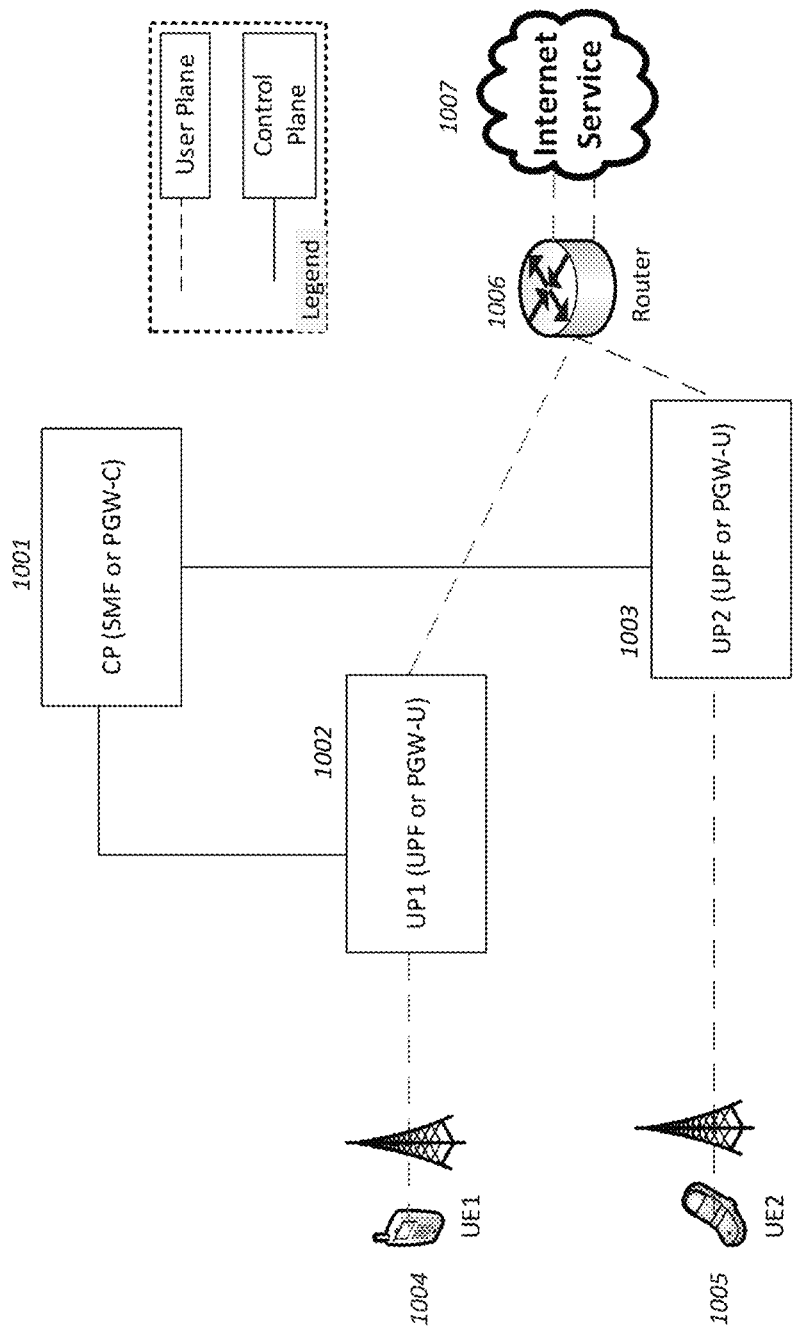
FIG. 1 shows the CP and UP interworking with a router as the next hop.
Figure 2:
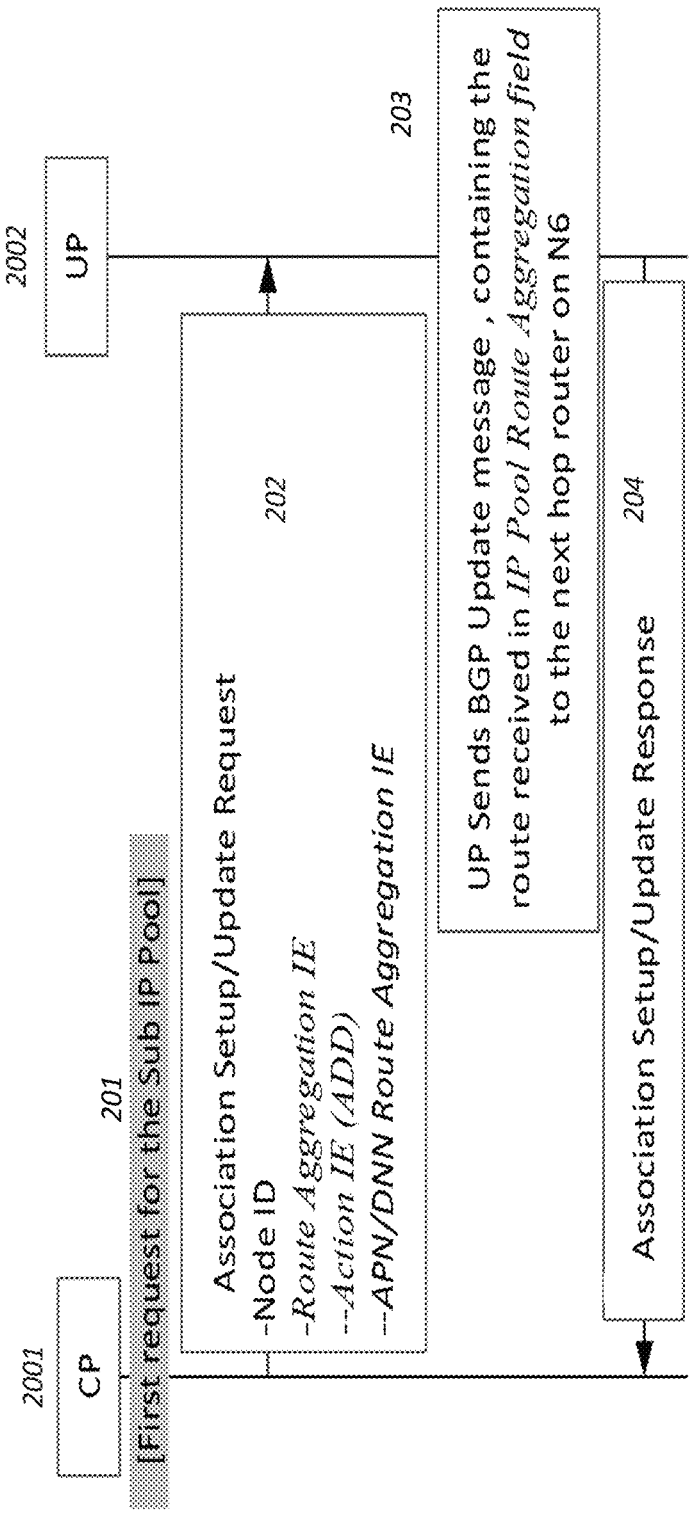
FIG. 2 shows an example of provisioning of routes by the CP to the UP.

In accordance with an example embodiment of the present disclosure, in the case when the CP is allocating the IP pools and traffic routing is done at the UP, a solution is provided for obtaining the IP pool blocks and providing them to the next hop router for the correct packet routing. As shown in FIG. 2, during the start or update of the CP-UP association, the CP 2001 shall send the routes to be used to the UP 2002 in an information element (IE), e.g., a vendor-specific IE. As referenced by 201, the "first request for the Sub IP Pool" is done at the CP 2001, i.e., the CP executes a procedure in which it allocates the first IP address from an unused sub IP Pool to a UE while allocating it to a Packet Data Unit (PDU) session. Next, as shown in the block 202, an Association Setup Request or Association Update Request is sent by the CP 2001 to the UP 2002, which Association Setup Request or Association Update Request includes the following: node ID; and Route Aggregation IE. The Route Aggregation IE in turn contains and Action IE (in this example, ADD) and ACCESS POINT NAME (APN)/DATA NETWORK NAME (DNN) Route Aggregation IE. The APN/DNN Route Aggregation IE contains the field "IP Pool Route Aggregation" (the routes to be used by the UP 2002). Next, as shown in the block 203, UP 2002 sends a Border Gateway Protocol (BGP) Update message to the next hop router (e.g., on N6 interface), which BGP Update message contains the route received in IP Pool Route Aggregation field. Subsequently, as shown in the block 204, the UP 2002 sends an association setup/update response to the CP 2001. As shown in FIG. 2, the CP 2001 is sending the Route Aggregation IE to ADD a route, which is an operation unsolicited by the UP 2002.

Figure 3:
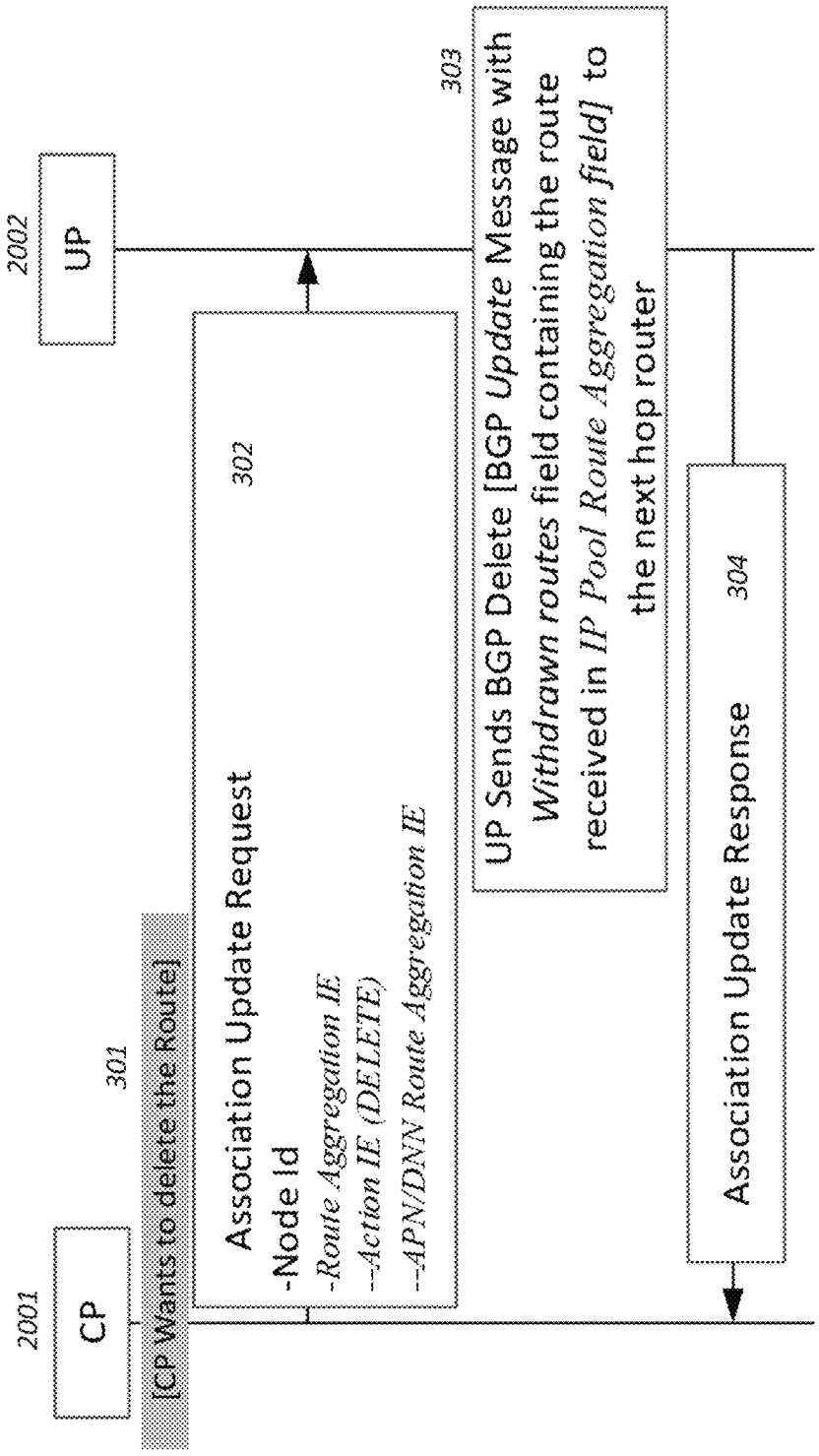
FIG. 3 shows an example signal flow diagram of route-deletion initiated by the CP.

FIG. 3 shows an example signal flow diagram of route-deletion initiated by the CP. During the update of the Association, the CP can decide to remove certain routes to be used by the UP (e.g., in a vendor-specific IE). As referenced by 301, the CP 2001 wants to delete one or more specified routes belonging to a given pool. Next, as shown in the block 302, an Association Update Request is sent by the CP 2001 to the UP 2002, which Association Update Request includes the following: node ID; and Route Aggregation IE. The Route Aggregation IE in turn contains an Action IE (in this example, DELETE) and APN/DNN Route Aggregation IE. The APN/DNN Route Aggregation IE contains the field "IP Pool Route Aggregation" (the routes to be deleted by the UP 2002). Next, as shown in the block 303, UP 2002 sends a Border Gateway Protocol (BGP) Delete message to the next hop router, which BGP Delete message is BGP Update message with Withdrawn Routes field containing the route received in IP Pool Route Aggregation field. Subsequently, as shown in the block 304, the UP 2002 sends an Association Update Response to the CP 2001. As shown in FIG. 3, the CP 2001 is sending the Route Aggregation IE to DELETE a route, which is an operation unsolicited by the UP 2002.

In this section, previously mentioned Route Aggregation IE will be discussed in greater detail. As mentioned in connection with FIGS. 2 and 3, the UP 2002 receives from the CP 2001 indication of the relevant routes in a Route Aggregation IEs, e.g., vendor-specific IEs. In the Route Aggregation IE, the specific Action shall be encoded as an integer, i.e., allowed values are: ADD=1; DELETE=2; and GET=3. Number of APN/DNN Route Aggregation Information shall be encoded as an integer, i.e., allowed values are 0-65535. This shall be equal to the number of APN/DNN Route Aggregation Information IE in the message. It should be noted that the value 0 is used when there is no APN/DNN Route Aggregation Information IE in the message for the Action ADD or DELETE.

APN/DNN Route Aggregation IE shall be specified by including: Network Instance IE; Number of IP Pool Route Aggregation; and IP Pool Route Aggregation IE. Network Instance IE field shall be encoded as 3GPP-defined Network Instance IE (type 22), and it shall contain Network Identifier (NI) and Operator Identifier (OI) field (i.e., APN/DNN Name) and will be provided as a string. Number of IP Pool Route Aggregation shall be encoded as an integer, i.e., allowed values are 1-65535. This shall be the number of IP Pool Route Aggregation IE in the message, which IP Pool Route Aggregation IE can be a vendor-specific IE. IP Pool Route Aggregation IE shall be specified by: IP Pool Route Aggregation shall be encoded as an OctetString. As an example, IP Pool Route Aggregation can be encoded 10.10.1.1/24

Figure 4:
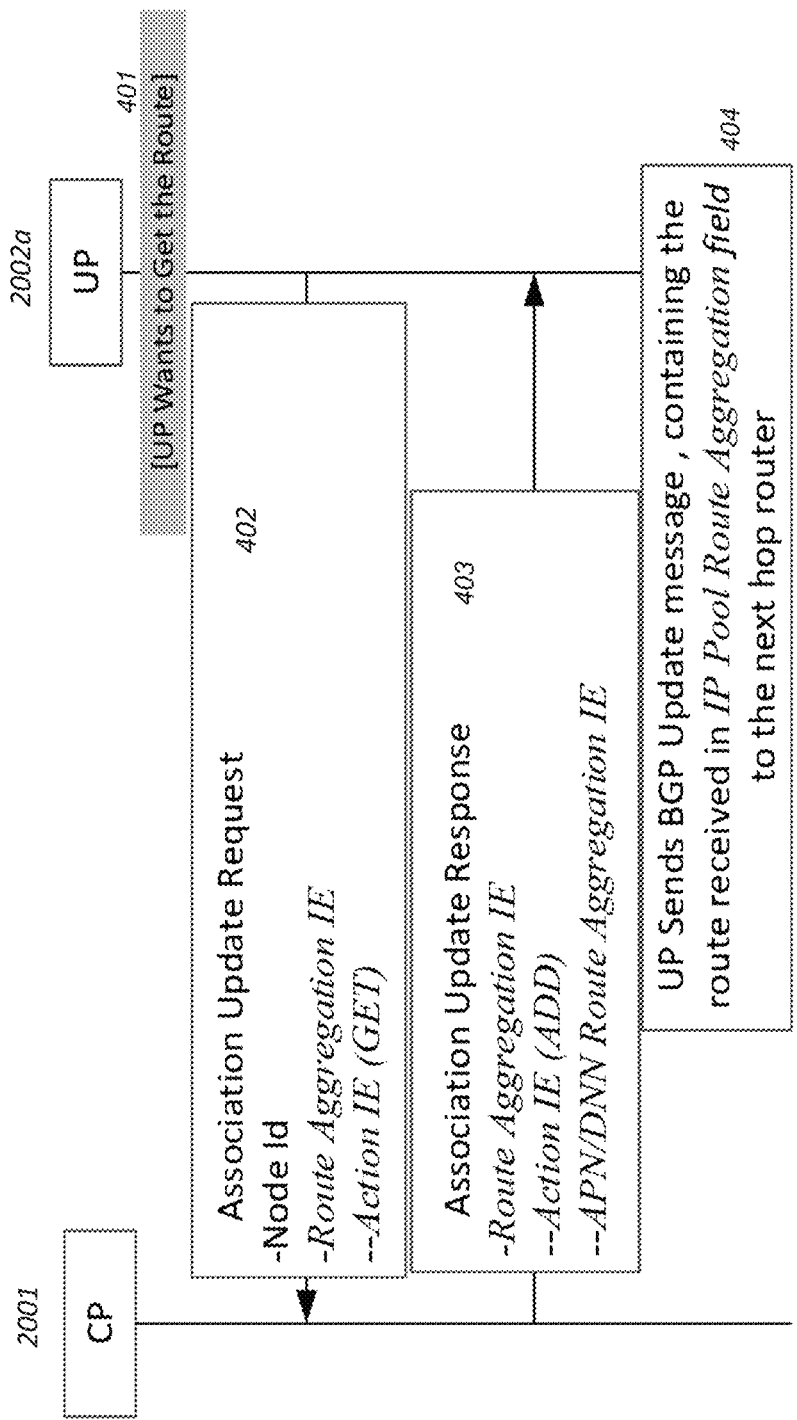
FIG. 4 shows an example signal flow diagram for UP path failure and recovery.

According to an example embodiment of the present disclosure, during the UP path failure and recovery, when the standby UP takes over after the UP path failure and recovery, the standby UP shall send an Association Update Request to obtain the route(s). FIG. 4 shows an example signal flow diagram for this scenario. As referenced by 401, the standby UP 2002a (that has taken over after the UP path failure and recovery) wants to obtain the route. As shown in the block 402, an Association Update Request is sent by the UP 2002a to the CP 2001, which Association Update Request includes the following: node ID; and Route Aggregation IE containing the Action IE (in this example, GET). In response, as shown in the block 403, the CP 2001 sends the Association Update Response with Route Aggregation IE containing the Action IE (ADD) and APN/DNN Route Aggregation IE. The APN/DNN Route Aggregation IE contains the field "IP Pool Route Aggregation" (the routes to be used by the UP 2002a). If there are no routes, then the CP 2001 shall send the Association Update Response with no Route Aggregation IE. The existing session shall not be impacted due to failure of Association Update Request. Upon receiving the routes, the UP 2002a sends a Border Gateway Protocol (BGP) Update message to the next hop router (as shown in the block 404), which BGP Update message contains the route received in IP Pool Route Aggregation field.

Figure 5:
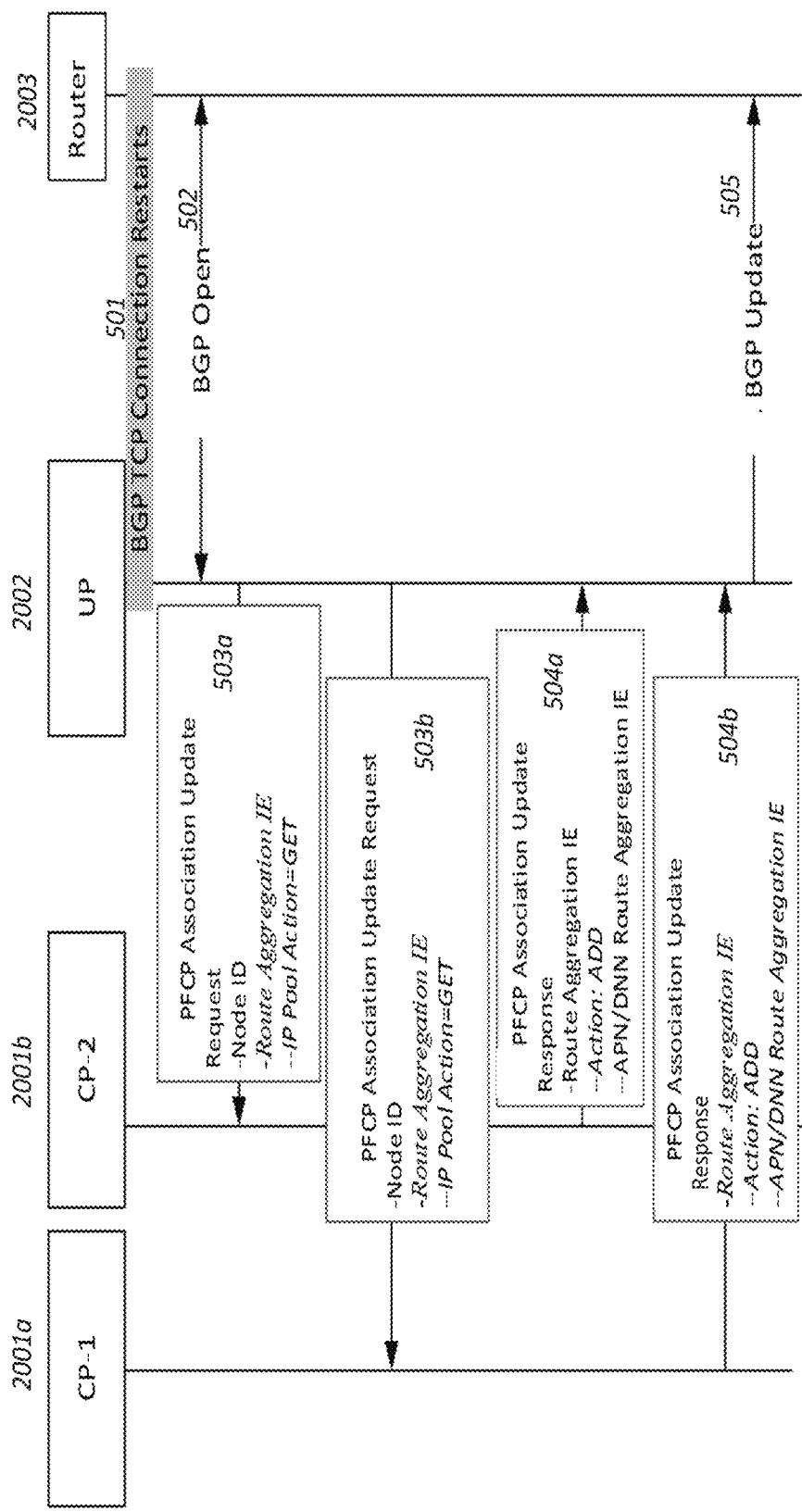
FIG. 5 shows an example signal flow diagram for TCP connection reset handling.

According to an example embodiment of the present disclosure, in a scenario involving a reset of the Transmission Control Protocol (TCP) connection between a router and the UP, in order to handle this reset, the UP shall fetch the routes from the respective CP and install the routes to the next hop router. This example scenario is illustrated in FIG. 5, which shows two CPs (CP-1 2001a, and CP-2 2001b), to which the UP 2002 is connected, and Router 2003 is connected to the UP 2002. As shown at 501, a BGP TCP connection with Router 2003 restarts, and the UP 2002 or the Router 2003 initiates the BGP Open message (as shown at 502). Next, as shown at the blocks 503a and 503b, the UP 2002 sends the Packet Forwarding Control Protocol (PFCP) Association Update Request containing Node ID and Route Aggregation IE (which in turn contains IP Pool Action=GET) to CP-2 2001b (as shown in block 503a) and CP-1 2001a (as shown in block 503b) with which the UP 2002 has the Setup. In response, the CP-2 2001b and CP-1 2001a send (in blocks 504a and 504b, respectively) the respective PFCP Association Update Response containing the Route Aggregation IE (which in turn contains Action IE (ADD) and APN/DNN Route Aggregation IE) to the to the UP 2002 if there are routes association for the given UP 2002. The Response shall not contain any Route Aggregation IE in the case there are no routes to be advertised for the UP 2002. Next, as shown at 505, the UP 2002 sends the BGP Update message to the Router 2003 for the route updates.

In summary, in accordance with an example embodiment of the present disclosure, in the case when CP is allocating the IP Pools and traffic routing is done at the UP, thereby presenting a challenge in the downlink traffic routing, the example embodiment solves the issue of obtaining the IP Pool blocks and providing it to the next hop router for the correct packet routing. In accordance with an example embodiment of the present disclosure, in the case of the UP path failure and recovery of the UP, where the routes are not in the persistent storage at the UP, the IP Pool allocated by the CP is to be retrieved again by the standby UP and propagated to the next hop router, so that the downlink packets can be routed to the correct UP.

An example method of route aggregation handling for 3rd Generation Partnership Project (3GPP) Control Plane and User Plane Separation (CUPS) architecture comprises: allocating, by a Control Plane (CP) node, an Internet Protocol (IP) Address from an IP pool to a selected User Equipment (UE) for a Packet Data Unit (PDU) session; performing, by a User Plane (UP) node, data traffic routing between an internet service provider (ISP) and the UE; and sending, by the CP node to the UP node during one of a start or update of an association between the CP node and the UP node, one of: i) transmission routes to be used for the data traffic routing between the ISP and the UE; or ii) transmission routes to be deleted for the data traffic routing between the ISP and the UE. The transmission routes to be used (or alternatively, deleted) are provided by the CP node in a route aggregation information element within one of an association setup request or an association update request sent to the UP node.

An example system for route aggregation handling for 3rd Generation Partnership Project (3GPP) Control Plane and User Plane Separation (CUPS) architecture comprises: a Control Plane (CP) node configured to allocate an Internet Protocol (IP) Address from an IP pool to a selected User Equipment (UE) for a Packet Data Unit (PDU) session; and a User Plane (UP) node configured to perform data traffic routing between an internet service provider (ISP) and the UE; and wherein the CP node is configured to send to the UP node, during one of a start or update of an association between the CP node and the UP node, one of: i) transmission routes to be used for the data traffic routing between the ISP and the UE; or ii) transmission routes to be deleted for the data traffic routing between the ISP and the UE. The transmission routes to be used (or alternatively, deleted) are provided by the CP node in a route aggregation information element within one of an association setup request or an association update request sent to the UP node.

ACRONYMS

5G $5^{th}$ Generation
5GC 5G Core Network
5GS 5G System
APN ACCESS POINT NAME
BGP Border Gateway Protocol
CP Control Plane
DHCP Dynamic Host Configuration Protocol
DL Downlink
DNN DATA NETWORK NAME
IE Information Element
NI Network Identifier
OI Operator Identifier
PDU Packet Data Unit
PGW-C Packet Gate Way-Control
PGW-U Packet Gate Way-User
SMF Session Management Function
TCP Transmission Control Protocol
UL Uplink
UP User Plane
UPF User Plane Function

What is claimed:

1. A method of route aggregation handling for 3rd Generation Partnership Project (3GPP) Control Plane and User Plane Separation (CUPS) architecture, comprising:
   allocating, by a Control Plane (CP) node, an Internet Protocol (IP) Address from an IP pool to a selected User Equipment (UE) for a Packet Data Unit (PDU) session;
   performing, by a User Plane (UP) node, data traffic routing between an internet service provider (ISP) and the UE;
   sending, by the CP node to the UP node during one of a start or update of an association between the CP node and the UP node, one of: i) transmission routes to be used for the data traffic routing between the ISP and the UE; or ii) transmission routes to be deleted for the data traffic routing between the ISP and the UE; and
   in the case of a UP path failure involving the UP node, sending by a standby UP node to the CP node an association update request for the transmission routes to be used for the data traffic routing between the ISP and the UE.

2. The method according to claim 1, wherein the CP node sends the transmission routes to be used as part of one of an association setup request or an association update request to the UP node.

3. The method according to claim 2, wherein the transmission routes to be used are provided by the CP node in a route aggregation information element within the one of the association setup request or the association update request sent to the UP node.

4. The method according to claim 3, wherein the transmission routes to be used are contained in internet protocol (IP) pool route aggregation field within the route aggregation information element.

5. The method according to claim 4, further comprising:
   sending, by the UP node to a next hop router, a Border Gateway Protocol (BGP) Update message containing the IP pool route aggregation field.

6. The method according to claim 1, wherein the CP node sends the transmission routes to be deleted as part of one of an association setup request or an association update request to the UP node.

7. The method according to claim 6, wherein the transmission routes to be deleted are provided by the CP node in a route aggregation information element within the one of the association setup request or the association update request sent to the UP node.

8. The method according to claim 7, wherein the transmission routes to be deleted are contained in internet protocol (IP) pool route aggregation field within the route aggregation information element.

9. The method according to claim 7, further comprising:
   sending, by the UP node to a next hop router, a Border Gateway Protocol (BGP) Update message containing the IP pool route aggregation field.

10. A system for route aggregation handling for 3rd Generation Partnership Project (3GPP) Control Plane and User Plane Separation (CUPS) architecture, comprising:

a Control Plane (CP) node configured to allocate an Internet Protocol (IP) Address from an IP pool to a selected User Equipment (UE) for a Packet Data Unit (PDU) session; and a User Plane (UP) node configured to perform data traffic routing between an internet service provider (ISP) and the UE; and a standby UP node configured to send to the CP node, in the case of a UP path failure involving the UP node, an association update request for the transmission routes to be used for the data traffic routing between the ISP and the UE;

wherein the CP node is configured to send to the UP node, during one of a start or update of an association between the CP node and the UP node, one of: i) transmission routes to be used for the data traffic routing between the ISP and the UE; ii) transmission routes to be deleted for the data traffic routing between the ISP and the UE; or iii) transmission routes to be withdrawn for the data traffic routing between the ISP and the UE.

11. The system according to claim 10, wherein the CP node is configured to send the transmission routes to be used as part of one of an association setup request or an association update request to the UP node.

12. The system according to claim 11, wherein the transmission routes to be used are provided by the CP node in a route aggregation information element within the one of the association setup request or the association update request sent to the UP node.

13. The system according to claim 12, wherein the transmission routes to be used are contained in internet protocol (IP) pool route aggregation field within the route aggregation information element.

14. The system according to claim 13, wherein the UP node is configured to send to a next hop router, a Border Gateway Protocol (BGP) Update message containing the IP pool route aggregation field.

15. The system according to claim 10, wherein the CP node sends the transmission routes to be deleted as part of one of an association setup request or an association update request to the UP node.

16. The system according to claim 15, wherein the transmission routes to be deleted are provided by the CP node in a route aggregation information element within the one of the association setup request or the association update request sent to the UP node.

17. The system according to claim 16, wherein the transmission routes to be deleted are contained in internet protocol (IP) pool route aggregation field within the route aggregation information element.

18. The system according to claim 16, wherein the UP node is configured to send to a next hop router, a Border Gateway Protocol (BGP) Update message containing the IP pool route aggregation field.

* * * * *